United States Patent
Yanagida et al.

(10) Patent No.: US 7,175,939 B2
(45) Date of Patent: *Feb. 13, 2007

(54) NON-AQUEOUS ELECTROLYTE SECONDARY BATTERY

(75) Inventors: Katsunori Yanagida, Itami (JP); Naoya Nakanishi, Kobe (JP); Atsuhiro Funahashi, Toyonaka (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 513 days.

This patent is subject to a terminal disclaimer.

(21) Appl. No.: 10/663,713

(22) Filed: Sep. 17, 2003

(65) Prior Publication Data

US 2004/0062995 A1 Apr. 1, 2004

(30) Foreign Application Priority Data

Sep. 30, 2002 (JP) ............................. 2002-284741
Aug. 21, 2003 (JP) ............................. 2003-297376

(51) Int. Cl.
*H01M 10/40* (2006.01)
*H01M 4/58* (2006.01)
*H01M 4/50* (2006.01)
*H01M 4/52* (2006.01)

(52) U.S. Cl. ....................... 429/331; 429/223; 429/224; 429/231.3; 429/231.8

(58) Field of Classification Search ................. 429/331, 429/332, 231.1, 231.3, 221, 223, 224, 231.8
See application file for complete search history.

(56) References Cited

U.S. PATENT DOCUMENTS

| | | | |
|---|---|---|---|
| 5,352,548 A | 10/1994 | Fujimoto et al. | ............ 429/341 |
| 5,626,981 A | 5/1997 | Simon et al. | ............... 429/105 |
| 5,700,597 A * | 12/1997 | Zhong et al. | ............. 429/231.1 |
| 6,413,678 B1 | 7/2002 | Hamamoto et al. | ......... 429/332 |
| 6,455,199 B1 * | 9/2002 | Kitagawa et al. | ........... 429/231.8 |
| 6,664,008 B1 * | 12/2003 | Suzuki et al. | ................ 429/337 |
| 6,794,089 B2 * | 9/2004 | Sekino et al. | ................ 429/331 |
| 6,884,546 B1 * | 4/2005 | Fujita et al. | ............. 429/331 X |
| 6,929,885 B2 * | 8/2005 | Kotato et al. | ................ 429/331 |
| 2002/0061443 A1 * | 5/2002 | Nakanishi et al. | ........... 429/223 |
| 2004/0062993 A1 * | 4/2004 | Yanagida et al. | ......... 429/231.8 |
| 2004/0110064 A1 * | 6/2004 | Kitao et al. | ................. 429/224 |

FOREIGN PATENT DOCUMENTS

| | | | |
|---|---|---|---|
| EP | 1391959 | * | 2/2006 |
| JP | 08-045545 | | 2/1996 |

* cited by examiner

*Primary Examiner*—Stephen J. Kalafut
(74) *Attorney, Agent, or Firm*—Westerman, Hattori, Daniels & Adrian, LLP.

(57) ABSTRACT

In a non-aqueous electrolyte secondary battery provided with a positive electrode, a negative electrode using carbon material as negative electrode active material, and a non-aqueous electrolyte solution, the non-aqueous electrolyte solution contains at least a saturated cyclic carbonic ester and a cyclic carbonic ester having C=C double bond where an amount of the cyclic carbonic ester having C=C double bond is in a range of $1.0 \times 10^{-8}$ to $13.0 \times 10^{-5}$ g per negative electrode capacity of 1 mAh.

14 Claims, 4 Drawing Sheets

NON-AQUEOUS ELECTROLYTE SECONDARY BATTERY

BACKGROUND OF THE INVENTION

1. Field of the Invention

The present invention relates generally to a non-aqueous electrolyte secondary battery provided with a positive electrode, a negative electrode using carbon material as a negative electrode active material, and a non-aqueous electrolyte solution, and particularly, to a non-aqueous electrolyte secondary battery using carbon material as a negative electrode active material, which is featuring an increased cycle life and an improved output characteristics at high rate.

2. Description of the Related Art

Recently, as one of advanced batteries featuring high power and high energy density, non-aqueous electrolyte secondary batteries of high electromotive force derived from oxidation and reduction of lithium, using a non-aqueous electrolyte solution, have come into practical use.

In such non-aqueous electrolyte secondary batteries, carbon materials capable of absorbing and desorbing lithium ions including graphite and cokes are generally used as a negative electrode active material in a negative electrode. Especially, where graphite-containing carbon material having high crystallinity is used, the non-aqueous electrolyte secondary batteries having high energy density are attained, therefore, the graphite-containing carbon material has come into wide use.

There has been proposed to use the non-aqueous electrolyte solution containing a vinylene carbonate derivative, to increase cycle life of the non-aqueous electrolyte secondary battery using the graphite-containing carbon material as the negative electrode active material (see Japanese Patent Publication No. 8-45545).

Where the non-aqueous electrolyte solution containing the vinylene carbonate derivative is used in the non-aqueous electrolyte secondary battery using the graphite-containing carbon material as the negative electrode active material, the vinylene carbonate derivative is reduced during a first charge, a surface film is formed on a surface of the negative electrode active material, thus, side reactions in which the non-aqueous electrolyte solution is decomposed during charge and discharge are prevented for the effect of the surface film, as a result, the cycle life of the non-aqueous electrolyte secondary battery is expected to increase.

Unfortunately, however, where the surface film is formed on the surface of the negative electrode active material, there have remained problems that output characteristics during discharge at high current is degraded by the surface film, especially, in middle or large sized non-aqueous electrolyte secondary batteries of high output, the output characteristics at high current is extremely degraded.

SUMMARY OF THE INVENTION

An object of the present invention is to solve the above-mentioned various problems in a non-aqueous electrolyte secondary battery provided with a positive electrode, a negative electrode using carbon material as a negative electrode active material, and a non-aqueous electrolyte solution.

More specifically, an object of the present invention is, in a non-aqueous electrolyte secondary battery using the carbon material as the negative electrode active material and in which cyclic carbonic ester having C=C double bond including vinylene carbonate is added to the non-aqueous electrolyte solution to form a surface film on a surface of the negative electrode active material, to prevent degradation of output characteristics at high current caused by the surface film, to increase cycle life, and to improve output characteristics at high rate.

The non-aqueous electrolyte secondary battery according to the present invention is provided with the positive electrode, the negative electrode using the carbon material as the negative electrode active material, and the non-aqueous electrolyte solution, wherein the non-aqueous electrolyte solution contains at least a saturated cyclic carbonic ester and the cyclic carbonic ester having C=C double bond where content by amount of the cyclic carbonic ester having C=C double bond is in a range of $1.0 \times 10^{-8}$ to $13.0 \times 10^{-5}$ g per negative electrode capacity of 1 mAh.

Where the non-aqueous electrolyte solution contains the cyclic carbonic ester having C=C double bond as the non-aqueous electrolyte secondary battery of the present invention, the cyclic carbonic ester having C=C double bond is reduced during first charge, the surface film is formed on the surface of the negative electrode active material using the carbon material, thus the side reactions in which the non-aqueous electrolyte solution is decomposed during charge and discharge are prevented for the effect of the surface film, as a result, the cycle life of the non-aqueous electrolyte secondary battery increases.

In adding the cyclic carbonic ester having C=C double bond to the non-aqueous electrolyte solution, where the amount of the cyclic carbonic ester having C=C double bond to be added is set in the range of $1.0 \times 10^{-5}$ to $13.0 \times 10^{-5}$ g per negative electrode capacity of 1 mAh as the non-aqueous electrolyte secondary battery of the present invention, the surface film having proper thickness is formed on the surface of carbon material as the negative electrode active material, thus the cycle life of the non-aqueous electrolyte secondary battery increases, and the degradation of the output characteristics at high current is prevented. In another word, where the amount of the cyclic carbonic ester having C=C double bond to be added is less than $1.0 \times 10^{-8}$ g per negative electrode capacity of 1 mAh, sufficient surface film is not formed on the surface of the carbon material, and decomposition of the non-aqueous electrolyte solution during charge and discharge is not sufficiently prevented, thus the cycle life of the non-aqueous electrolyte secondary battery is decreased. On the other hand, where the amount of the cyclic carbonic ester having C=C double bond to be added is more than $13.0 \times 10^{-5}$ g per negative electrode capacity of 1 mAh, the surface film formed on the surface of the carbon material becomes excessively thick, and the output characteristics at high current is degraded.

In the non-aqueous electrolyte secondary battery according to the present invention, the amount of the negative electrode active material in the negative electrode is preferably set in the range of 1.0 to 12 mg/cm$^2$. Because where the amount of the negative electrode active material is less than 1.0 mg/cm$^2$, sufficient battery capacity is not attained. On the other hand, where the amount of the negative electrode active material is more than 12 mg/cm$^2$, the surface film formed on the surface of the negative electrode active material from the cyclic carbonic ester having C=C double bond becomes insufficient, and the decomposition of the non-aqueous electrolyte solution during charge and discharge is not sufficiently prevented, thus output cycle characteristics at high current is degraded.

In the non-aqueous electrolyte secondary battery of the present invention, graphite-containing carbon material is preferably used as the carbon material for use as the negative electrode active material in order to improve discharge characteristics of the non-aqueous electrolyte secondary battery, especially the graphite-containing carbon material having spacing of (002) Plane, $d_{002}$, in the range of 0.335 to 0.338 nm as measured by X-ray diffraction analysis and containing crystallite whose size along the c-axis length (Lc) is not less than 30 nm is preferably used. The surface of graphite-containing carbon material may be coated with amorphous carbon material.

In addition, where the graphite-containing carbon material having a ratio ($I_{110}/I_{002}$) between a peak intensity $I_{002}$ of (002) Plane and the peak intensity $I_{110}$ of (110) Plane in the range of $5 \times 10^{-3}$ to $15 \times 10^{-3}$ as measured by the X-ray diffraction analysis is used, the discharge characteristics of the non-aqueous electrolyte secondary battery is further improved.

Further, the graphite-containing carbon material having R value ($I_D/I_G$) in the range of 0.15 to 0.7 as measured by Raman spectroscopy is preferably used.

The aforesaid R value ($I_D/I_G$) is the ratio of the peak intensity ($I_D$) of 1360 cm$^{-1}$ based on the peak intensity ($I_G$) of 1580 cm$^{-1}$ as measured by laser Raman spectroscopic measurement. The peak in 1580 cm$^{-1}$ originates in a stacking structure having hexagonal symmetry which is similar to graphite structure, while the peak in 1360 cm$^{-1}$ originates in an amorphous structure. The higher the R value ($I_D/I_G$) is, the larger the proportion of an amorphous part on the surface of the graphite-containing carbon material is. When the crystallinity of the surface of the graphite-containing carbon material is low, a uniform, stable, and close surface film having excellent lithium-ion-mobility is formed for the effect of the cyclic carbonic ester having C=C double bond contained in the non-aqueous electrolyte solution, and where the R value ($I_D/I_G$) is not less than 0.15, an excellent low temperature characteristics is attained. On the other hand, where the R value ($I_D/I_G$) is more than 0.70, there occur problems that the surface of the graphite-containing carbon material becomes quite amorphous and charge/discharge efficiency is degraded.

Examples of the cyclic carbonic ester having C=C double bond contained in the non-aqueous electrolyte solution in the non-aqueous electrolyte secondary battery of the present invention include vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-propyl vinylene carbonate, and vinyl ethylene carbonate, and in order to form the uniform and stable surface film having excellent lithium-ion-mobility on the surface of the graphite-containing carbon material, the cyclic carbonic ester having C=C double bond in its ring, especially vinylene carbonate, is preferably used.

Examples of the saturated cyclic carbonic ester contained in the non-aqueous electrolyte solution include ethylene carbonate, propylene carbonate, and butylene carbonate, and these solvents may be used in combination of two or more, especially, ethylene carbonate, propylene carbonate, and a mixed solvent of ethylene carbonate and propylene carbonate are preferably used.

In the non-aqueous electrolyte secondary battery of the present invention, a chain carbonic ester is preferably contained in the non-aqueous electrolyte solution in order to lower viscosity of the non-aqueous electrolyte solution, and to improve the discharge characteristics at normal temperature or at low temperature. Examples of the chain carbonic ester include dimethyl carbonate, ethyl methyl carbonate, diethyl carbonate, methyl propyl carbonate, ethyl propyl carbonate, and methyl isopropyl carbonate, and these solvents may be used alone or in combination of two or more.

The non-aqueous electrolyte solution may contain a non-aqueous solvent which has been generally used in the non-aqueous electrolyte secondary batteries. Examples of the non-aqueous solvent include ester group including methyl acetate, ethyl acetate, propyl acetate, methyl propionate, ethyl propionate, γ-butyrolactone, ether group including tetrahydrofuran, 2-methyl tetrahydrofuran, 1,4-dioxane, 1,2-dimethoxyethane, 1,2-diethoxyethane, nitrile group including acetonitrile, and amide group including dimethylformamide.

In the non-aqueous electrolyte secondary battery of the present invention, a known electrolytic salt may be used as the electrolytic salt contained in the non-aqueous electrolyte solution. Examples of the usable electrolytic salt include LiPF$_6$, LiAsF$_6$, LiBF$_4$, LiCF$_3$SO$_3$, LiN(C$_l$F$_{2l+1}$SO$_2$)(C$_m$F$_{2m+1}$SO$_2$) (wherein l and m denote an integer not less than 1), LiC(C$_p$F$_{2p+1}$SO$_2$) (C$_q$F$_{2q+1}$SO$_2$) (C$_r$F$_{2r+1}$SO$_2$) (wherein p, q, and r denote the integer not less than 1), and these electrolytic salts may be used alone or in combination of two or more. Concentration of the electrolytic salt in the non-aqueous electrolyte solution is generally set in the range of 0.1 to 1.5 mol/l, and is preferably set in the range of 0.5 to 1.5 mol/l.

In the non-aqueous electrolyte secondary battery of the present invention, a lithium-containing transition metal oxide including lithium-cobalt oxide (LiCoO$_2$), lithium-nickel oxide (LiNiO$_2$), and lithium-manganese oxide (LiMn$_2$O$_4$) may be used as a positive electrode active material in the positive electrode.

The non-aqueous electrolyte secondary battery using a mixture of lithium-manganese-containing composite oxide having a spinel structure represented by a general formula Li$_x$Mn$_{2-y1}$M1$_{y2}$O$_{4+z}$ (wherein M1 denotes at least one element selected from a group consisting of Al, Co, Ni, Mg, and Fe, and relationships $0 \leq x \leq 1.5$, $0 \leq y1 \leq 1.0$, $0 \leq y2 \leq 0.5$, and $-0.2 \leq z \leq 0.2$ are satisfied), and lithium-nickel-cobalt-manganese composite oxide represented by the general formula Li$_a$Ni$_b$Co$_c$Mn$_d$O$_2$ (wherein the relationships $0 \leq a \leq 1.2$ and b+c+d=1 are satisfied) is further improved in the output characteristics and the cycle life. The reason for the improvement is expected to be that where the amount of the cyclic carbonic ester having C=C double bond to be added is set in the range of $1.0 \times 10^{-8}$ to $13.0 \times 10^{-5}$ g per negative electrode capacity of 1 mAh, the surface film having proper thickness is formed on the surface of carbon material as the negative electrode active material, and deposition of Mn which elutes from the positive electrode on the negative electrode is prevented for the effect of the surface film. Where the lithium-manganese-containing composite oxide and the lithium-nickel-cobalt-manganese composite oxide are mixed in a weight ratio of 20:80 to 80:20, the output characteristics is further improved.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

The following examples specifically illustrate non-aqueous electrolyte secondary batteries according to the present invention. Further, comparative examples will be taken to make it clear that each non-aqueous electrolyte secondary battery according to the examples present an increased cycle life and an improved discharge characteristics at high rate discharge. It should be appreciated that the non-aqueous electrolyte secondary batteries according to the present invention are not particularly limited to those in the following examples, and various changes and modifications may be made in the invention without departing from the spirit and scope thereof.

EXAMPLE 1

Figure 1:
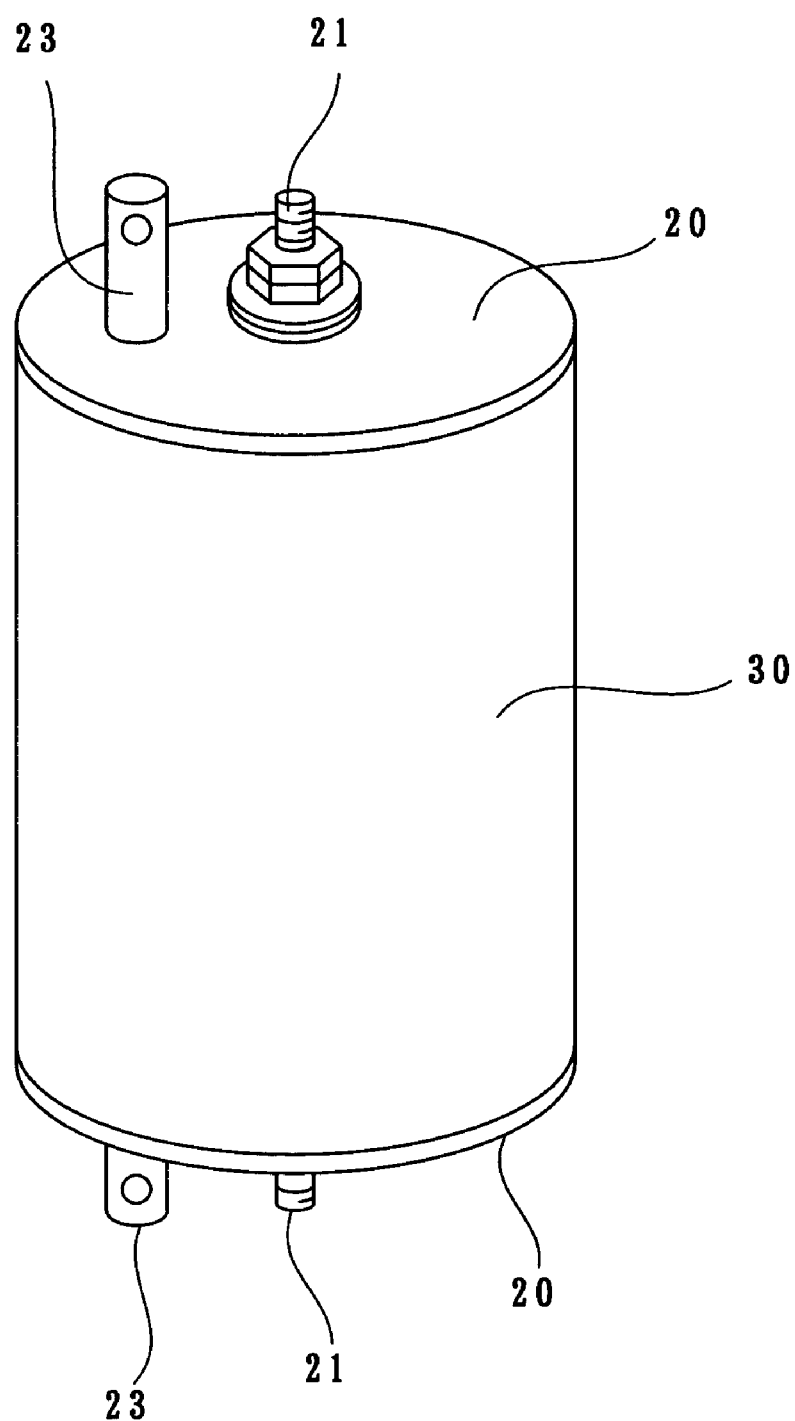
FIG. 1 is a schematic perspective view of a non-aqueous electrolyte secondary battery according to Examples and Comparative Examples of the present invention.

In example 1, there were used a positive electrode, a negative electrode, and a non-aqueous electrolyte solution prepared in the following manners so as to fabricate a cylindrical non-aqueous electrolyte secondary battery as shown in FIG. 1.

(Preparation of Positive Electrode)

In the preparation of a positive electrode, a lithium-manganese-containing composite oxide having a spinel structure represented by a general formula $Li_{1.125}Mn_{1.875}O_4$ and a lithium-nickel-cobalt-manganese composite oxide represented by the general formula $LiNi_{0.4}Co_{0.3}Mn_{0.3}O_2$ were mixed in a weight ratio of 4:6 to obtain a positive electrode active material.

The positive electrode active material, carbon powder as a conductive agent, and polyvinylidene fluoride as a binding agent were mixed in a weight ratio of 90:5:5 to obtain a positive electrode mixture. N-methyl-2-pyrolidone liquid was added to the mixture to adjust slurry. Next, the slurry was applied to both sides of an aluminum foil as a positive electrode current collector. The slurry on the aluminum foil was then subject to vacuum drying and rolling to obtain a positive electrode. The amount of the positive electrode active material in the positive electrode was 12 mg/cm².

(Preparation of Negative Electrode)

In the preparation of a negative electrode, natural graphite powder having an average particle diameter of 20 μm ($d_{002}$=0.3356 nm, Lc>100 nm, $I_{110}/I_{002}$=11×10⁻³, $R(I_d/I_G)$=0.16) was used as a negative electrode active material. The negative electrode active material, styrene-butadiene rubber, and carboxymethyl cellulose were mixed in a weight ratio of 98:1:1 to obtain a negative electrode mixture. Water was added to the mixture to adjust slurry. Next, the slurry was applied to both sides of a copper foil as a negative electrode current collector. The slurry on the copper foil was then subject to vacuum drying and rolling to obtain a negative electrode. The amount of the natural graphite powder as the negative electrode active material in the negative electrode was 5 mg/cm².

(Preparation of Non-aqueous Electrolyte Solution)

In the preparation of a non-aqueous electrolyte solution, ethylene carbonate which is a saturated cyclic carbonic ester, diethyl carbonate which is a chain carbonic ester, and dimethyl carbonate which is the chain carbonic ester were mixed in a volume ratio of 35:50:15 to prepare a mixed solvent, in which lithium hexafluorophosphate $LiPF_6$ was dissolved in a concentration of 1 mol/l, and to which vinylene carbonate which is the cyclic carbonic ester having C=C double bond was further added so that the amount thereof be $7.5 \times 10^{-5}$ g per negative electrode capacity of 1 mAh, to obtain a non-aqueous electrolyte solution.

(Fabrication of Battery)

Figure 2:
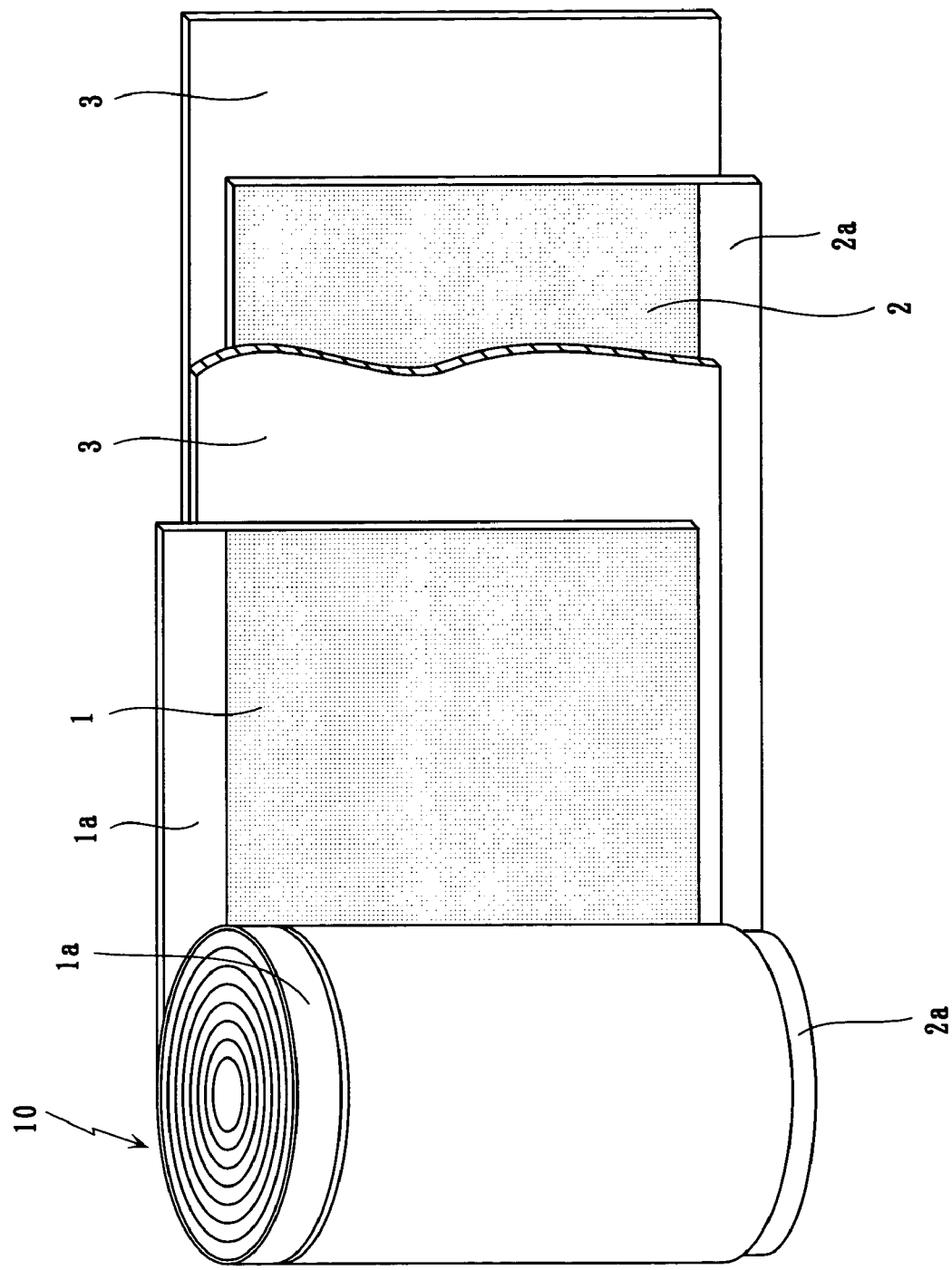
FIG. 2 is a schematic explanatory diagram showing a formation of an electrode body according to Examples and Comparative Examples of the present invention.

In the fabrication of a battery, as shown in FIG. 2, the positive electrode 1 and the negative electrode 2 prepared in the above-mentioned manners were arranged to be shifted from each other in width direction, a separator 3 formed of a porous polypropylene film was interposed between the positive electrode 1 and the negative electrode 2, and they were spirally wound to form a electrode body 10. In one end of the electrode body 10, an edge of a positive electrode current collector 1a in the positive electrode 1 was exsert outside along an axis compared with the edge of the separator 3, while in another one end of the electrode body 10, the edge of a negative electrode current collector 2a in the negative electrode 2 was exsert outside along the axis compared with the edge of the separator 3.

Figure 3:
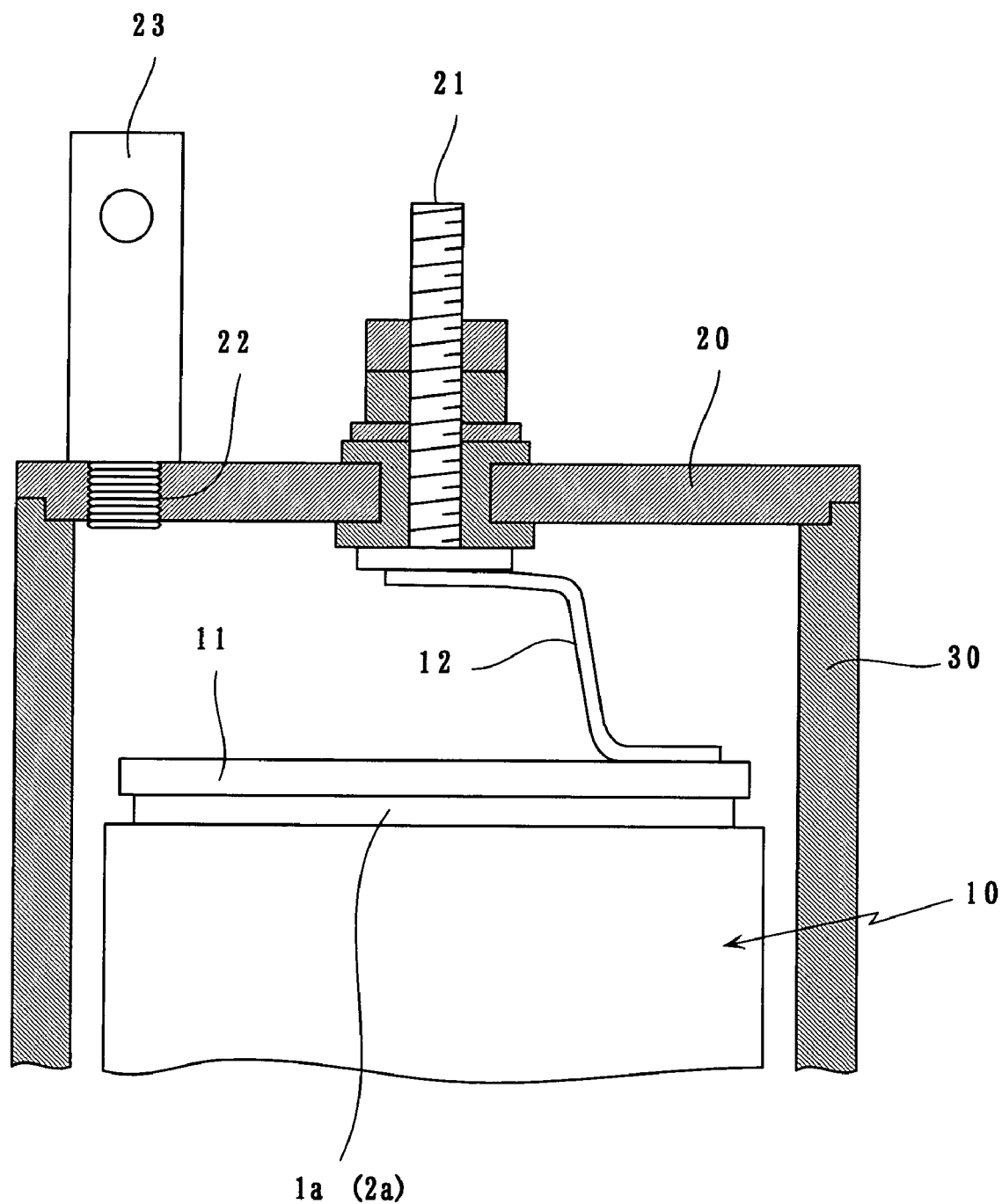
FIG. 3 is a explanatory cross section showing an internal structure of a non-aqueous electrolyte secondary battery according to Examples and Comparative Examples of the present invention.
Figure 4:
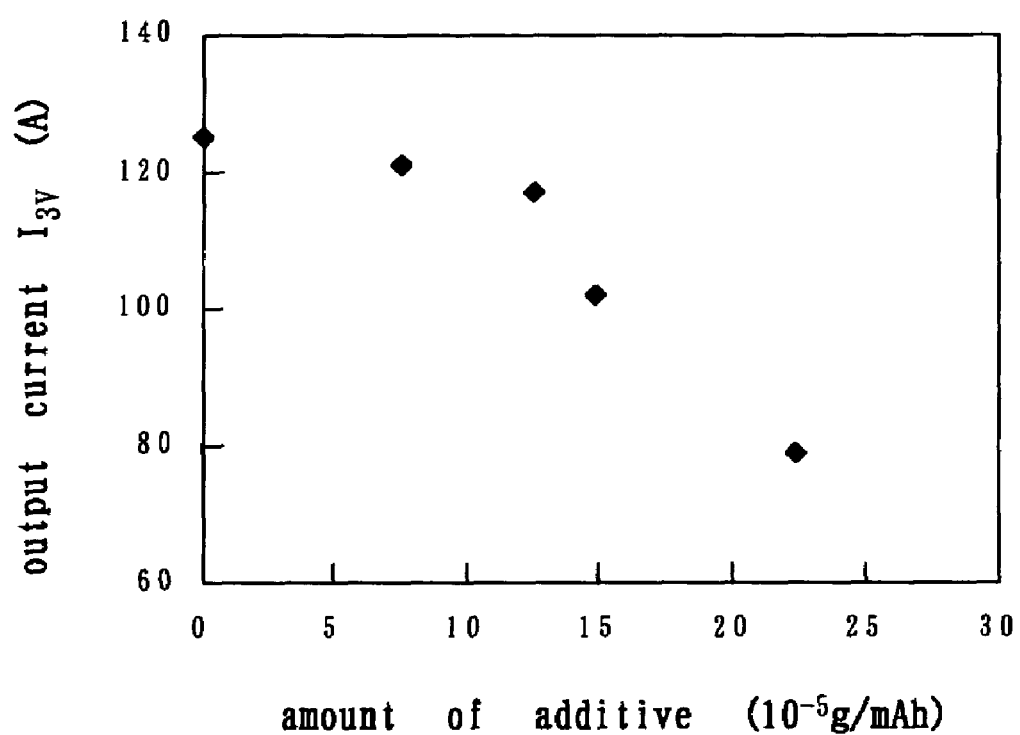
FIG. 4 is a graphical representation of a relationship between amount of vinylene carbonate per negative electrode capacity of 1 mAh and output current $I_{3\nu}$ of the non-aqueous electrolyte secondary battery according to Examples and Comparative Examples of the present invention.

Further, as shown in FIG. 3, in the electrode body 10, the positive electrode current collector 1a and the negative electrode current collector 2a which were exsert outside along the axis compared with respective edges of the separator 3 were respectively welded to current collecting plates 11, then respective leads 12 on the current collecting plates 11 were connected to respective electrode terminal mechanisms 21 installed in covers 20, after which the electrode body 10 was contained in a cylindrical body 30, and the covers 20 were welded and fixed to apertures of the cylindrical body 30.

The non-aqueous electrolyte solution was poured from pouring apertures 22 formed on the covers 20, and gas exhaust valves 23 were installed on the pouring apertures 22 so as to fabricate a cylindrical non-aqueous electrolyte secondary battery having a diameter of 40 mm and height of 90 mm as shown in FIG. 1.

EXAMPLE 2

In Example 2, in the preparation of the non-aqueous electrolyte solution of Example 1, the amount of vinylene carbonate added to the non-aqueous electrolyte solution was changed to $12.5 \times 10^{-5}$ g per negative electrode capacity of 1 mAh. Except for the above, the same procedure as that in the Example 1 was taken to fabricate a non-aqueous electrolyte secondary battery of Example 2.

COMPARATIVE EXAMPLE 1

In Comparative Example 1, in the preparation of the non-aqueous electrolyte solution of Example 1, vinylene carbonate was not added to the non-aqueous electrolyte solution. Except for the above, the same procedure as that in the Example 1 was taken to fabricate a non-aqueous electrolyte secondary battery of Comparative Example 1.

COMPARATIVE EXAMPLE 2

In Comparative Example 2, in the preparation of the non-aqueous electrolyte solution, the amount of vinylene carbonate added to the non-aqueous electrolyte solution was changed to $14.9 \times 10^{-5}$ g per negative electrode capacity of 1 mAh. Except for the above, the same procedure as that in the Example 1 was taken to fabricate a non-aqueous electrolyte secondary battery of Comparative Example 2.

COMPARATIVE EXAMPLE 3

In Comparative Example 3, in the preparation of the non-aqueous electrolyte solution, the amount of vinylene carbonate added to the non-aqueous electrolyte solution was changed to $22.4 \times 10^{-5}$ g per negative electrode capacity of 1 mAh. Except for the above, the same procedure as that in the Example 1 was taken to fabricate a non-aqueous electrolyte secondary battery of Comparative Example 3.

Each of the non-aqueous electrolyte secondary batteries of Examples 1 and 2, and Comparative Examples 1 to 3 thus fabricated was charged at a constant current of 6.5 A to 4.2 V, and was further charged at a constant voltage of 4.2 V, wherein the two steps of the charge took 2.5 hours in total, then, was discharged at the constant current of 2.15 A to 3.0 V, so as to measure battery capacity Q of each of the non-aqueous electrolyte secondary batteries.

Each of the non-aqueous electrolyte secondary batteries, which was thus charged at the constant current of 6.5 A to 4.2 V and then at the constant voltage of 4.2 V wherein the two steps of the charge took 2.5 hours in total, was discharged at the constant current of 2.15 A to half of the battery capacity Q, to prepare 3 of the respective non-aqueous electrolyte secondary batteries of Examples 1 and 2, and Comparative Examples 1 to 3 in which depth of discharge (DOD) was 50%, then, each of the batteries thus prepared was discharged at a discharge current of 8.5 A, 21.5 A, and 34.5 A for 10 seconds so as to measure the voltage of each of the batteries.

Based on results of the discharge current I and the battery voltage V, I-V characteristics of the non-aqueous electrolyte secondary batteries of Examples 1 and 2, and Comparative Examples 1 to 3 was inspected to find resistance value R of each of the non-aqueous electrolyte secondary batteries based on slope of straight line thus found, and to find Vo of each of the non-aqueous electrolyte secondary batteries by way of the following formula. The results were shown in the following Table 1.

$$V = Vo - RI$$

In addition, based on the R and Vo values of the non-aqueous electrolyte secondary batteries of Examples 1 and 2, and Comparative Examples 1 to 3, $I_{3V}$ which is output current of each of the non-aqueous electrolyte secondary batteries discharged at 3V was found by way of the following formula. The results were shown in the following Table 1 and FIG. 2.

$$I_{3V} = (Vo - 3)/R$$

TABLE 1

| | amount of vinylene carbonate to be added (g/mAh) | R (Ω) | Vo (V) | $I_{3V}$ (A) |
|---|---|---|---|---|
| Example 1 | $7.5 \times 10^{-5}$ | 0.0068 | 3.824 | 121 |
| Example 2 | $12.5 \times 10^{-5}$ | 0.0070 | 3.823 | 117 |
| Comparative Example 1 | 0 | 0.0066 | 3.824 | 125 |
| Comparative Example 2 | $14.9 \times 10^{-5}$ | 0.0077 | 3.823 | 107 |
| Comparative Example 3 | $22.4 \times 10^{-5}$ | 0.0104 | 3.822 | 79 |

As apparent from the results, the non-aqueous electrolyte secondary batteries of Examples 1 and 2 in which the amount of vinylene carbonate added to the non-aqueous electrolyte solution was in the range of $1.0 \times 10^{-8}$ to $13.0 \times 10^{-5}$ g per negative electrode capacity of 1 mAh presented an increased value of $I_{3V}$ which is the output current of the batteries discharged at 3V and an improved output characteristics at high rate compared with the non-aqueous electrolyte secondary batteries of Comparative Examples 2 and 3 in which the amount of vinylene carbonate was more than $13.0 \times 10^{-5}$ g per negative electrode capacity of 1 mAh.

Then, each of the non-aqueous electrolyte secondary batteries of Example 1 and Comparative Example 1 was charged at the constant current of 6.5 A to 4.2 V, and was further charged at the constant voltage of 4.2 V, wherein the two steps of the charge took 2.5 hours in total, then, was discharged at the constant current of 2.15 A to 3.0 V so as to measure battery capacity before cycles Qo.

Next, an operation, comprising steps of charging at the constant current of 6.5 A until state of charge (SOC) became 20%, then, in a container with a constant temperature of 45° C., charging at a constant electric power of 50 W for one second followed by suspension for one second, and discharging at the constant electric power of 30 W for one second followed by the suspension for one second, was continuously performed to the non-aqueous electrolyte secondary batteries of Example 1 and Comparative Example 1 until the state of charge (SOC) thereof became 80%. When the state of charge (SOC) of each of the non-aqueous electrolyte secondary batteries became 80%, another operation, comprising the steps of charging at a constant electric power of 30 W for one second followed by the suspension for one second, and discharging at the constant electric power of 50 W for one second followed by the suspension for one second, was continuously performed until the state of charge (SOC) of each of the non-aqueous electrolyte secondary batteries became 20%.

The above-mentioned operations to set the state of charge (SOC) between 20% and 80% were continuously performed for 3000 hours, then, each of the non-aqueous electrolyte secondary batteries was taken out from the container with the constant temperature, and was discharged at the constant current of 2.15 A to 3.0 V. Next, each of the non-aqueous electrolyte secondary batteries was charged at the constant current of 6.5 A to 4.2 V, and was further charged at the constant voltage of 4.2 V, wherein the two steps of the charge took 2.5 hours in total, then, was discharged at the constant current of 2.15 A to 3.0 V, so as to measure the battery capacity after cycles Qa and to find percentage of retention capacity after cycles by way of the following formula. The results were shown in the following Table 2.

$$\text{Percentage of retention capacity}(\%) = (Qa/Qo) \times 100$$

TABLE 2

| | amount of vinylene carbonate to be added (g/mAh) | percentage of retention capacity (%) |
|---|---|---|
| Example 1 | $7.5 \times 10^{-5}$ | 85 |
| Comparative Example 1 | 0 | 75 |

As a result, the non-aqueous electrolyte secondary battery of Comparative Example 1 in which vinylene carbonate was not added to the non-aqueous electrolyte solution presented the increased value of the output current $I_{3V}$ in the prior experiment, however, presented an extremely lowered percentage of retention capacity after cycles and degraded cycle life.

EXAMPLE 3

In Example 3, in the preparation of the negative electrode of Example 1, the amount of the natural graphite powder as the negative electrode active material in the negative electrode was changed to 10 mg/cm$^2$, and the amount of the positive electrode active material in the positive electrode was changed to 24 mg/cm$^2$. Except for the above, the same procedure as that in the Example 1 in which the amount of vinylene carbonate added to the non-aqueous electrolyte solution was $7.5 \times 10^{-5}$ g per negative electrode capacity of 1 mAh was taken to fabricate a non-aqueous electrolyte secondary battery of Example 3.

EXAMPLE 4

In Example 4, in the preparation of the negative electrode of Example 1, the amount of the natural graphite powder as the negative electrode active material in the negative electrode was changed to 15 mg/cm$^2$, and the amount of the positive electrode active material in the positive electrode was changed to 36 mg/cm$^2$. Except for the above, the same procedure as that in the Example 1 in which the amount of vinylene carbonate added to the non-aqueous electrolyte solution was $7.5 \times 10^{-5}$ g per negative electrode capacity of 1 mAh was taken to fabricate a non-aqueous electrolyte secondary battery of Example 4.

COMPARATIVE EXAMPLE 4

In Comparative Example 4, the amount of natural graphite powder as the negative electrode active material in the negative electrode was changed to 15 mg/cm$^2$, and the amount of the positive electrode active material in the positive electrode was changed to 36 mg/cm$^2$ in the same manner as the Example 4, and the amount of vinylene carbonate added to the non-aqueous electrolyte solution was changed to $14.9 \times 10^{-5}$ g per negative electrode capacity of 1 mAh in the same manner as the Comparative Example 2. Except for the above, the same procedure as that in the Example 1 was taken to fabricate a non-aqueous electrolyte secondary battery of Comparative Example 4.

COMPARATIVE EXAMPLE 5

In Comparative Example 5, the amount of natural graphite powder as the negative electrode active material in the negative electrode was changed to 15 mg/cm$^2$, and the amount of the positive electrode active material in the positive electrode was changed to 36 mg/cm$^2$ in the same manner as the Example 4, and the amount of vinylene carbonate added to the non-aqueous electrolyte solution was changed to $22.4 \times 10^{-5}$ g per negative electrode capacity of 1 mAh in the same manner as the Comparative Example 3. Except for the above, the same procedure as that in the Example 1 was taken to fabricate a non-aqueous electrolyte secondary battery of Comparative Example 5.

$I_{3V}$ which is the output current of each of the non-aqueous electrolyte secondary batteries of the Examples 3 and 4, and the Comparative Examples 4 and 5 discharged at 3V was found in the same manner as that of the Examples 1 and 2, and the Comparative Examples 1 to 3. The results were shown in the following Table 3 along with those of Example 1.

TABLE 3

| | amount of negative electrode active material (mg/cm$^2$) | amount of vinylene carbonate to be added (g/mAh) | $I_{3V}$ (A) |
|---|---|---|---|
| Example 1 | 5 | $7.5 \times 10^{-5}$ | 121 |
| Example 3 | 10 | $7.5 \times 10^{-5}$ | 96 |
| Example 4 | 15 | $7.5 \times 10^{-5}$ | 64 |
| Comparative Example 4 | 15 | $14.9 \times 10^{-5}$ | 60 |
| Comparative Example 5 | 15 | $22.4 \times 10^{-5}$ | 55 |

As apparent from the results, the non-aqueous electrolyte secondary batteries of Examples 1 and 3 in which the amount of the natural graphite powder as the negative electrode active material in the negative electrode was in the range of 1.0 to 12 mg/cm$^2$ presented the increased value of $I_{3V}$ which is the output current of the batteries discharged at 3V and the improved output characteristics at high rate compared with the non-aqueous electrolyte secondary battery of Example 4 in which the amount of the natural graphite powder as the negative electrode active material was 15 mg/cm$^2$ which is more than 12 mg/cm$^2$.

According to a comparison among the non-aqueous electrolyte secondary batteries of Example 4 and Comparative Examples 4 and 5 in which the amount of the natural graphite powder as the negative electrode active material was 15 mg/cm$^2$ which is more than 12 mg/cm$^2$, the non-aqueous electrolyte secondary battery of Example 4 in which the amount of vinylene carbonate added to the non-aqueous electrolyte solution was within the range of $1.0 \times 10^{-8}$ to $13.0 \times 10^{-5}$ g per negative electrode capacity of 1 mAh presented the increased value of $I_{3V}$ which is the output current of the batteries discharged at 3V and the improved output characteristics at high rate compared with the non-aqueous electrolyte secondary batteries of Comparative Examples 4 and 5 in which the amount of vinylene carbonate was more than $13.0 \times 10^{-5}$ g per negative electrode capacity of 1 mAh.

Although the present invention has been fully described by way of examples, it is to be noted that various changes and modification will be apparent to those skilled in the art.

Therefore, unless otherwise such changes and modifications depart from the scope of the present invention, they should be constructed as being included therein.

What is claimed is:

1. A non-aqueous electrolyte secondary battery provided with a positive electrode, a negative electrode using carbon material as negative electrode active material, and a non-aqueous electrolyte solution, wherein said non-aqueous electrolyte solution contains at least a saturated cyclic carbonic ester and a cyclic carbonic ester having C=C double bond where an amount of the cyclic carbonic ester having C=C double bond is in a range of $1.0 \times 10^{-8}$ to $13.0 \times 10^{-5}$ g per negative electrode capacity of 1 mAh.

2. The non-aqueous electrolyte secondary battery according to claim 1, wherein
said carbon material as the negative electrode active material is graphite-containing carbon material.

3. The non-aqueous electrolyte secondary battery according to claim 2, wherein
said graphite-containing carbon material has spacing of (002) Plane, $d_{002}$, in the range of 0.335 to 0.338 nm and crystallite whose size along c-axis length (Lc) is not less than 30 nm as measured by X-ray diffraction analysis.

4. The non-aqueous electrolyte secondary battery according to claim 2, wherein
said the graphite-containing carbon material has a ratio ($I_{110}/I_{002}$) of a peak intensity $I_{110}$ of (110) Plane based on the peak intensity $I_{002}$ of the (002) Plane in the range of $5 \times 10^{-3}$ to $15 \times 10^{-3}$ as measured by X-ray diffraction analysis.

5. The non-aqueous electrolyte secondary battery according to claim 2, wherein
said graphite-containing carbon material has an R value ($I_D/I_G$) as measured by Raman spectroscopy in the range of 0.15 to 0.7.

6. The non-aqueous electrolyte secondary battery according to claim 1, wherein
the amount of the negative electrode active material in said negative electrode is in the range of 1.0 to 12 mg/cm$^2$.

7. The non-aqueous electrolyte secondary battery according to claim 1, wherein
the cyclic carbonic ester having C=C double bond in said non-aqueous electrolyte solution is at least one of vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-propyl vinylene carbonate, and vinyl ethylene carbonate.

8. The non-aqueous electrolyte secondary battery according to claim 7, wherein
the cyclic carbonic ester having C=C double bond in said non-aqueous electrolyte solution is vinylene carbonate.

9. The non-aqueous electrolyte secondary battery according to claim 1, wherein
the saturated cyclic carbonic ester in said non-aqueous electrolyte solution is at least one of ethylene carbonate, propylene carbonate, and butylene carbonate.

10. The non-aqueous electrolyte secondary battery according to claim 1, wherein
said non-aqueous electrolyte solution contains chain carbonic ester.

11. The non-aqueous electrolyte secondary battery according to claim 10, wherein
said chain carbonic ester is at least one of dimethyl carbonate, ethyl methyl carbonate, diethyl carbonate, methyl propyl carbonate, ethyl propyl carbonate, and methyl isopropyl carbonate.

12. The non-aqueous electrolyte secondary battery according to claim 1, wherein
positive electrode active material in said positive electrode contains lithium-manganese-containing composite oxide having a spinel structure and lithium-nickel-cobalt-manganese composite oxide.

13. The non-aqueous electrolyte secondary battery according to claim 12, wherein
said lithium-manganese-containing composite oxide having the spinel structure is represented by a general formula $Li_xMn_{2-y1}M1_{y2}O_{4+z}$ (wherein M1 denotes at least one element selected from a group consisting of Al, Co, Ni, Mg, and Fe, and relationships $0 \leq x \leq 1.5$, $0 \leq y1 \leq 1.0$, $0 \leq y2 \leq 0.5$, and $-0.2 \leq z \leq 0.2$ are satisfied), and said lithium-nickel-cobalt-manganese composite oxide is represented by the general formula $Li_aNi_bCo_cMn_dO_2$ (wherein the relationships $0 \leq a \leq 1.2$ and $b+c+d=1$ are satisfied).

14. The non-aqueous electrolyte secondary battery according to claim 12, wherein
the positive electrode active material contains the lithium-manganese-containing composite oxide having the spinel structure and the lithium-nickel-cobalt-manganese composite oxide in a weight ratio of 20:80 to 80:20.

* * * * *